Jan. 3, 1939. S. L. LEE 2,142,197
FISH KNIFE
Filed March 16, 1937
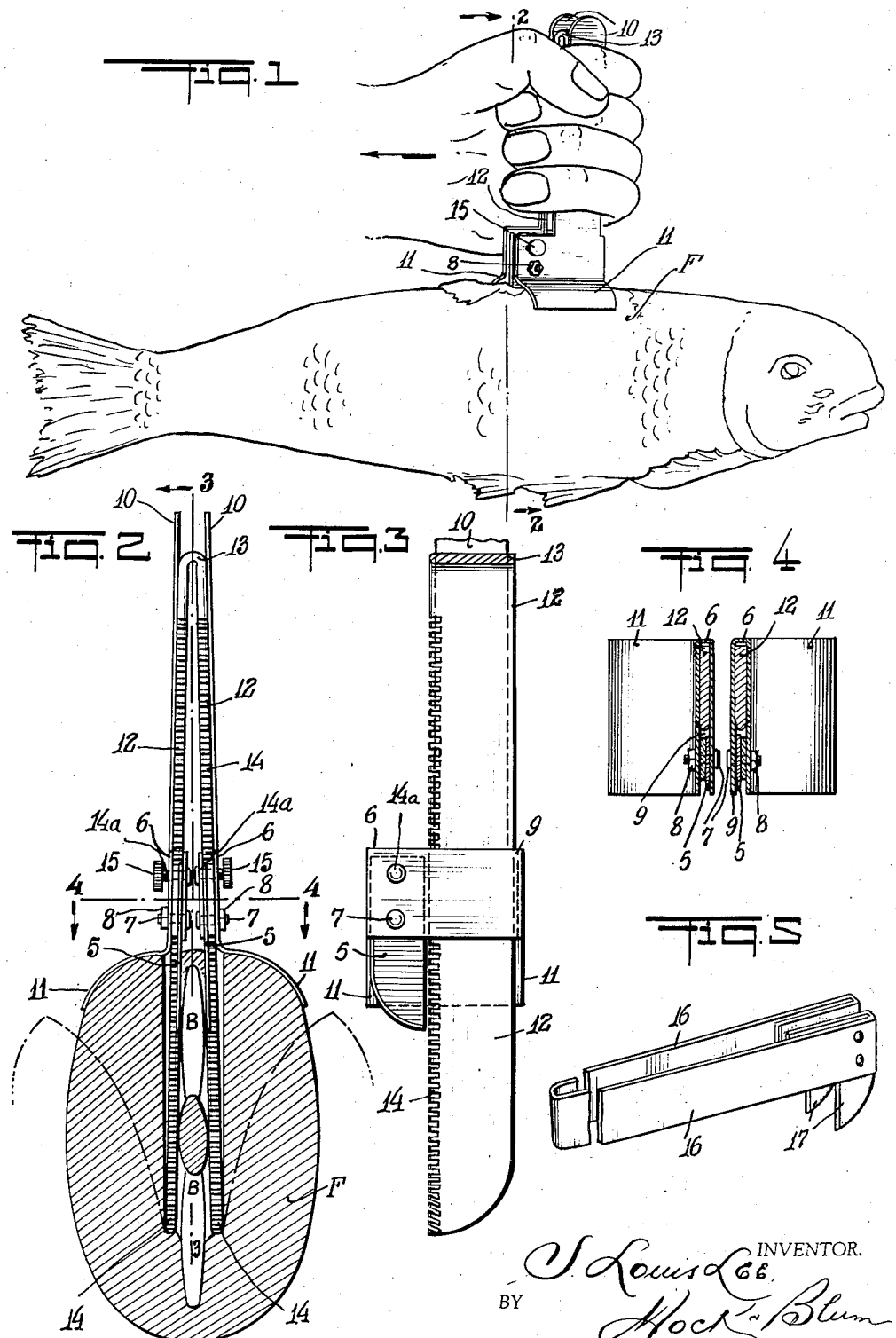
INVENTOR.
S. Louis Lee
BY
Hock & Blum
ATTORNEYS Patented Jan. 3, 1939

2,142,197

UNITED STATES PATENT OFFICE 2,142,197

FISH KNIFE

Say Louis Lee, New York, N. Y.

Application March 16, 1937, Serial No. 131,132

5 Claims. (Cl. 17—7)

This invention relates to fish cleaning means and more particularly to a tool for opening a fish and removing the bones therefrom.

An object of this invention is to provide a simple combination tool for simultaneously slitting the body of the fish and separating its bony skeleton from the adhering flesh.

Another object of this invention is to provide a fish knife which can be most easily adjusted to accommodate different sized fish.

Another object of this invention is to provide a novel comb device which can be used to separate the bones from the flesh most effectively.

Another object of this invention is to provide an efficient fish knife in which the hand of the operator is always safe from any cutting edges.

Other objects of my invention will appear in the following description and drawing which represent a preferred embodiment thereof, it being understood that the above statement of the objects of my invention is intended generally to explain the same without limiting it in any manner.

Fig. 1 is an elevation showing my knife in operation.

Fig. 2 is a section through the line 2—2 of Fig. 1.

Fig. 3 is a section through the line 3—3 of Fig. 2.

Fig. 4 is a section through the line 4—4 of Fig. 2.

Fig. 5 is a front view partly in perspective of the incision tool.

Referring to the figures wherein like numerals of reference indicate similar parts throughout the views, 5 generally designates a blade whose function it is to slit the back of the fish F as it is drawn by the hand of the operator. Each blade 5 is secured to a holder 6 which is folded to encompass the blade on both sides and held to the blade as by a bolt 7 suitably provided with a nut 8. In order to prevent relative movement between the blade 5 and its holder 6, I have provided in addition a bolt 14a and a knurled nut 15. I prefer to have a knurled nut so that the blade can be easily disengaged and sharpened. However, I do not wish to be limited to this arrangement, since it is obvious that it can be secured in numerous other ways. The folded portion of the holder extends laterally of the blade section and forms a hollow sleeve as at 9. From the outer side of this sleeve and integral therewith is an extension 10 extending upwards of the sleeve 9. Also from the outer side of this sleeve and integral with the sleeve 9 and the extension 10 is a rounded portion 11 which serves to guard the fingers from the sharp blade and also to limit the entrance of the knife into the body of the fish.

The part I have described I shall refer to hereafter in its entirety as the cutter. It is best shown in Fig. 3 where it is seen embracing an arm 12 whose construction and purpose will be explained.

My device is operated with two of these cutters which are slidably mounted on the arms 12. As shown in Fig. 2 the arms 12 are swingably connected to each other at 13 and this connection may be a hinge not shown. Due to this hinge construction at 13, the arms 12 are always angularly disposed to each other and this angle can be varied to accommodate different fish. These arms 12 are toothed at 14 but these teeth are like that of a comb and are not sharp. The teeth are generally perpendicular to the vertical axis of the arm 12 but at the base of said arm, the teeth lie at an angle as shown in Fig. 3. The cutters and the arms can be made of any suitable metal or composition but the blades 5 should be made of steel to afford them a sharp cutting edge.

In order to operate the tool, the cutters and the arms are assembled. It is only necessary to insert each arm 12 in the hollow sleeve 9 whereby the cutters will slide on the arms. The contact between the arms and the cutters will serve to maintain the position of the cutters thereon by a frictional fit but this fit should not be so tight as to prevent relative movement at the whim of the operator.

In order to facilitate the entrance of the arms into the body of the fish, I have provided an auxiliary device shown in Fig. 5. This device has the branches 16 and the blades 17 suitably secured thereto as shown.

My invention is operated in the following manner.

First the blades 17 of the auxiliary device are caused to enter the back of the fish near the head. Each blade should enter the fish at either side of the backbone shown in Fig. 2 as B. The auxiliary device is then removed and set aside, it having no other use. Then the arms 12 are inserted in the cuts and pushed down for some distance. The guard 11 is adjusted to rest on the surface of the fish as shown in Fig. 1 and this will automatically cause the blades to also enter the cuts and remain at the top portion of the fish. The tool is then drawn by the operator as indicated in Fig. 1. The blades 5 serve to slit the fish along both sides of its spine while the arms 12, encountering little resistance in the interior of the fish separate the bony skeleton from the edible portions. The toothed or serrated edges of the arms allow the small bones to pass like hair through an ordinary comb and the angle teeth at the bottom of the arm 12 serve to accommodate the curved bones that exist in the corresponding portion of the anatomy of the fish. It can be seen that as the tool is drawn throughout the length of the fish the body is slit, and the bony skeleton is separated from the flesh, and it only remains for the operator to spread the fish as indicated in Fig. 2 and discard the body skeleton.

I have shown one embodiment of my invention but it is apparent that many changes and omissions can be made without departing from its spirit. For example, while I have illustrated the auxiliary tool in Fig. 5, the incisions could be made by an ordinary knife or by numerous other means. Also, should the operator prefer to use the pivoted combs alone, he may slide the cutters off, slit the fish by ordinary means such as a knife, and use the combs to separate the skeleton from the flesh.

I claim:

1. A fish knife comprising in combination a pair of swingably connected arms, said arms having teeth formed thereon, and a blade slidably mounted on each arm.

2. A fish cleaning implement comprising in combination a pair of swingably connected arms, said arms having teeth formed thereon, some of said teeth being inclined to the horizontal axis of said arms.

3. A fish knife comprising in combination a pair of arms, said arms having teeth formed thereon, some of said teeth being inclined to the horizontal axis of said arms, and a blade slidably carried by each of said arms.

4. A fish knife comprising in combination a pair of swingably connected arms, said arms having teeth formed thereon, some of said teeth being inclined to the horizontal axis of said arms, a blade slidably mounted on each of said arms by means of a sleeve secured to said blade and encompassing the arm, and a guard to limit the entrance of the knife into the fish, said guard being formed integral with said sleeve whereby said blade, sleeve and guard slide together on each of said arms.

5. A fish knife comprising in combination a pair of swingably connected arms, said arms being dull and having dull teeth formed thereon, the teeth at the base of said arms being inclined to the horizontal axis of said arms, a blade slidably mounted on each of said arms, and a guard secured to each of said blades and adapted to protect the hands of the operator from the sharp edges of said blades.

S. LOUIS LEE.